United States Patent [19]
Tsutsumi et al.

[11] Patent Number: 5,248,565
[45] Date of Patent: Sep. 28, 1993

[54] OPTICAL-THERMAL MAGNETIC STORAGE MEDIUM

[75] Inventors: Kazuhiko Tsutsumi; Yoshio Fujii; Takaski Tokunaga, all of Amagasaki, Japan

[73] Assignee: Mitsubishi Denki Kabushiki Kaisha, Tokyo, Japan

[21] Appl. No.: 752,976

[22] Filed: Sep. 3, 1991

Related U.S. Application Data

[63] Continuation of Ser. No. 132,011, Dec. 14, 1987, abandoned.

[30] Foreign Application Priority Data

| Jan. 26, 1987 | [JP] | Japan | 62-15702 |
| May 14, 1987 | [JP] | Japan | 62-119774 |
| May 14, 1987 | [JP] | Japan | 62-119777 |

[51] Int. Cl.$^5$ .............................. G11B 5/66
[52] U.S. Cl. ................ 428/694 EC; 428/694 RE; 428/694 GR; 428/900; 369/13
[58] Field of Search ............... 428/694, 900; 360/131, 360/135; 365/122; 369/13, 14

[56] References Cited

U.S. PATENT DOCUMENTS

| 4,293,621 | 10/1981 | Togami | 428/694 |
| 4,556,291 | 12/1985 | Chen | 350/377 |
| 4,645,722 | 2/1987 | Katayama et al. | 428/694 |
| 4,670,356 | 6/1987 | Sato et al. | 428/900 |
| 4,753,853 | 6/1988 | Sato et al. | 428/679 |

FOREIGN PATENT DOCUMENTS

| 0051296 | 5/1982 | European Pat. Off. |
| 56-153546 | 11/1981 | Japan |
| 57-78652 | 5/1982 | Japan |
| 170837 | 5/1983 | Japan |
| 243840 | 12/1985 | Japan |

OTHER PUBLICATIONS

Kobayashi et al, "Magnetization Process of Exchange-Coupled Ferrimagnetic Double Layered Films," Jap. J. of Appl. Phys. vol. 20, No. 11, Nov. 1981 pp. 2089-2095.

Primary Examiner—Paul J. Thibodeau
Assistant Examiner—R. Follett
Attorney, Agent, or Firm—Jacobson, Price, Holman & Stern

[57] ABSTRACT

An optico-thermal magnetic recording medium comprises a substrate, a first layer of a ternary amorphous alloy represented by $Tb_x(Fe_{1-y}Co_y)_{1-x}$ or $Dy_x(Fe_{1-y}Co_y)_{1-x}$ on axis of easy magnetization perpendicular to the film plane of the layer, a second layer of ternary amorphous magnetic alloy represented by $Tb_x(Fe_{1-y}Co_y)_{1-x}$ or $Dy_x(Fe_{1-y}Co_y)_{1-x}$ having and axis of easy magnetization perpendicular to the film plane of the layer, the first and the second layers being formed one on another, light being incident on the side of the first layer, the first and the second layers having magnetic layers exchange-coupled. In the first layer $0.15 \leq x \leq 0.2$, and $0 < y < 0.5$. In the second layer $0.2 < x \leq 0.35$, and $0 < y < 0.5$. At room temperature, the first layer has magnetic dominance of FeCo Sub-lattice, and the second layer has magnetic dominance of Tb or Dy sub-lattice.

6 Claims, 5 Drawing Sheets

OPTICAL-THERMAL MAGNETIC STORAGE MEDIUM

This application is a continuation of application Ser. No. 132,011, filed Dec. 14, 1987, now abandoned.

BACKGROUND OF THE INVENTION

The present invention is related to optico-thermal magnetic storage media used in magneto optic memories, magnetic records, and display elements.

Presently known optico-thermal magnetic storage media are polycrystal films of MnBe, MnCuBi and the like, amorphous films of GdCo, GdFe, TbFe, DyFe, GdTbFe, TbDyFe, and the like and monocrystal films of G1G and the like. The above mentioned amorphous films are at present considered superior because of their capability of being formed over a wide area at about room temperatures, high efficiency in writing due to the smallness of the optico-thermal energy required for writing, and the superior efficiency of reading the written signals with a high signal-to-noise ratio.

However, these amorphous films also display a number of weaknesses. For example, GdFe has a small retentivity or coercive force and the recorded information is unstable. With GdFe and GdCo the magnetic compensation point is used for writing, and the film composition must be very carefully or strictly controlled during manufacturing to achieve uniform writing efficiency. With TbRe, DyFe, and TbDyFe, writing is performed by utilizing the Curie point, and the film composition need not be controlled so carefully, but the Curie point is only about 100° C. and a powerful light source cannot be used for reading the signals. Writing efficiency improves with lower Curie temperatures, but the written signals will be disturbed by the ambient temperature or by the light for reading. As a result, the Curie temperature should be as high as the writing is possible, but considering practical limitations a temperature of about 200° C. is optimum.

The signal-to-noise ratio of the reflected ray at readout is proportional to $\sqrt{R}\, \theta_k$, where R is the reflection coefficient, and $\theta_k$ the Kerr rotation angle. This relation shows that a larger Kerr rotation angle is advantageous to provide a good signal-to-noise ratio for the readout.

Table 1 at the end of the specification shows the Kerr rotation angle and curie temperatures for films of the main amorphous optico-thermal magnetic storage media.

Japanese Patent Application Laying-open No. 153546/1981 adopts a method for producing films with high Curie temperatures. It proposes a medium that is composed of a writing layer of high retentivity and vertical magnetic anisotropy on the surface of the substrate, and has on top of this writing layer a readout layer that has low coercive force or retentivity and vertical magnetic anisotropic properties.

As shown in Table 1 the TbFeCo film has an advantageous Curie temperature of around 200° C., and gives the largest Kerr rotation angle of the compounds, and gives a good signal-to-noise ratio that is advantageous for readout. However, the Kerr rotation angle is dependent on the Tb content, and Tb content should be low to achieve larger Kerr rotation angle. This may be seen from FIGS. 1A and 1B.

Figure 1A:
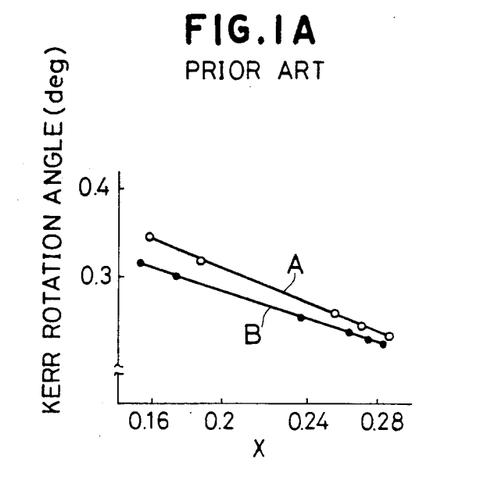
FIGS. 1A and 1B show the characteristics of compositions (x) and Kerr rotation angles (°), and compostions (x) and Curie temperatures (°C.) for $Tb_x(Fe_{1-y}Co_y)_{1-x}$ films.
Figure 1B:
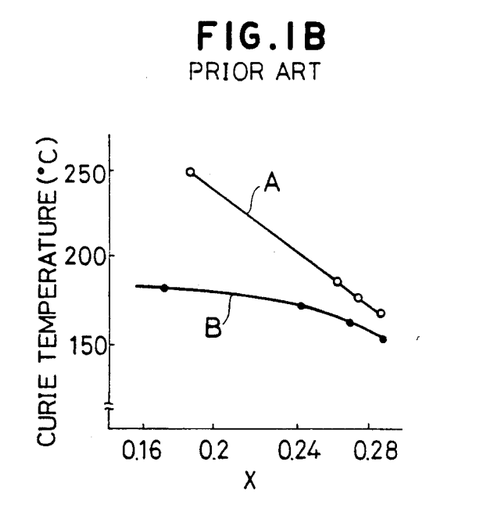

FIGS. 1A and 1B show the characteristic changes in Kerr rotation angle (°) and Curie temperature (°C.) for various $Tb_x(Fe_{1-y}Co_y)_{1-x}$ compositions.

In the figures, (A) shows a characteristic for y=0.7, and (B) for y=0.1. In FIG. 1A the abscissa is the composition (x) and the ordinate the Kerr rotation angle (°) while in FIG. 1B the abscissa is the composition (x) and the ordinate is the Curie temperature (°C.). When Tb content is low, noise level increases due to temperature dependence of saturation magnetization and signal-to-noise ratio is lowered. As a result, Tb content of 22–35% in the TbFeCo film is optimal. There is also the disadvantage that the Kerr rotation angle increases with Co content, increasing the Curie temperature and making higher energy necessary for writing.

Figure 2A:
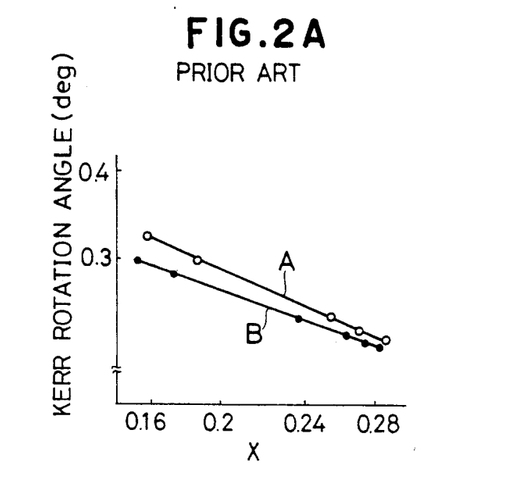
FIGS. 2A and 2B show the characteristics of compositions (x) and Kerr rotation angles (°), and compositions (x) and Curie temperatures (°C.) for $Dy_x(Fe_{1-y}Co_y)_{1-x}$ films.
Figure 2B:
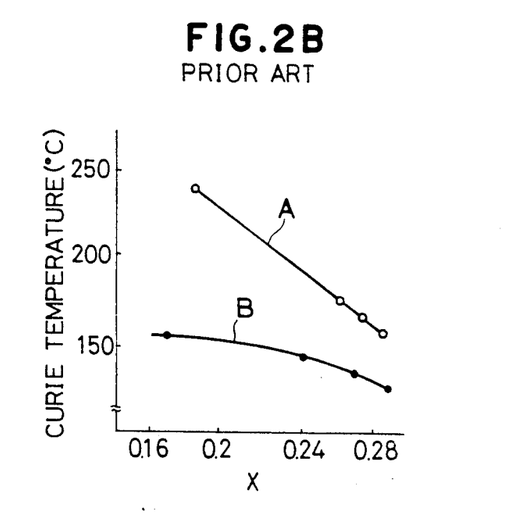

With TbFeCo ternary alloy films of the composition $Tb_x(Fe_{1-y}Co_y)_{1-x}$, the Curie temperature of the film at $y \geq 0.5$ becomes too high for either the first layer or the second layer, making recording impossible. This is also the case with DyFeCo films. With DyFeCo films it is possible to obtain Curie temperatures around 200 C. and large Kerr rotation angles, giving good signal-to-noise ratios for readout. The composition of DyFeCo films determine the Kerr rotation angle and Curie temperature, and larger Kerr rotation angle require smaller amounts of Dy. This is shown in (b) of FIG. 2A and FIG. 2B. FIGS. 2A and 2B are for $Dy_x(Fe_{1-y}Co_y)_{1-x}$ films and FIG. 2A shows characteristic changes in composition (x) and Kerr rotation angle and FIG. 2B shows changes in composition (x) and Curie temperature (°C.).

In the figures, (A) is the characteristics for y=0.20 and (B) for y=0.1. In FIG. 2A the abscissa is the composition (x) and the ordinate is the Kerr rotation angle (°), while in FIG. 2B the abscissa is the composition (x) and the ordinate is the Curie temperature (°C.). With low Dy contents the noise level increases due to the temperature dependence of the saturation magnetization (Ms). Due to this noise level increase, the signal-to-noise ratio is lowered. Accordingly, Dy contents of 22–35% are optimum in DyFeCo films. With increasing Co content the Kerr rotation angle increases but the Curie temperature rises, making a high energy necessary for writing.

Use of DyFeCo ternary alloy of the $Dy_x(Fe_{1-y}Co_y)_{1-x}$ composition, for either the first or second layer with $y \geq 0.5$ will give too high Curie temperatures of the film, making recording impossible.

To utilize the method shown in Japanese Patent Application Laying-open No. 153546/1981 which comprises writing information in the writing layer, transferring the information from the writing layer to the reading layer and reproducing the information from the reading layer by irradiating polarized light into the reading layer, it is required that the combination of the layers composition must be selected to obtain good transfer to achieve this, TbFe film, DyFe film or the like should be used for the writing layer, and GdFe films, GdCo films or the like should be used for the reading layer. This leads to a complex structure and a complex manufacturing process. There is a further problem in that the writing layer is between the reading layer and the substrate, and the light for regeneration does not pass through the substrate. Even with the mediation of a protective film, readout is directly from the film side, and so may be affected by dust and other debris on the medium.

In the Japanese Patent Application Laying-open No. 78652/1982, a layer capable of vertical magnetization and having strong retentivity, vertical magnetization and a low Curie point is formed on one surface and a layer with weak retentivity and high Curie point is formed on the other surface. This high retentivity layer and the low retentivity layer are exchange-coupled.

In the above Japanese Patent Application Laying-open No. 78652/1962, films of TbFe and DyFe are mentioned as examples of high retentivity layers and films of GdFe and GdCo as low retentivity layers. However, two-layer films with different elements is complicated in structure and the manufacturing conditions are difficult to establish.

Even media that are exchange-coupled may not be satisfactory. For instance, with a combination of TbFe film with magnetic dominance of the Tb sub-lattice and GdFe film with magnetic dominance of the Gd sub-lattice, a large Kerr rotation angle cannot be obtained and improvement in the signal-to-noise ratio cannot be expected. With magnetic dominance of the Fe sub-lattice in TbFe films and magnetic dominance of the Fe sub-lattice in GdFe films the noise level increase and improvement in the signal-to-noise ratio cannot be expected.

SUMMARY OF THE INVENTION

An object of this invention is to provide an optico-thermal magnetic memory medium which effectively effectively utilizes the highest obtainable Kerr rotation angle to efficiently generate an optical regeneration output.

An optico-thermal magnetic memory medium according to the invention comprises a first ternary amorphous magnetic alloy layer with the general formula $Tb_x(Fe_{1-y}Co_y)_{1-x}$ or $Dy_x(Fe_{1-y}Co_y)_{1-x}$ and having an axis of easy magnetization perpendicular to the film plane, and a second ternary amorphous magnetic alloy layer with the general formula $Tb_x(Fe_{1-y}Co_y)_{1-x}$ or $Dy_x(Fe_{1-y}Co_y)_{1-x}$ and having an axis of easy magnetization perpendicular to the film plane, both layers being placed on a substrate. The above first and second amorphous magnetic alloy layers are irradiated with light that enters from the first amorphous magnetic alloy layer. The two amorphous magnetic alloy layers comprise magnetic layers that are exchange-coupled, with $0.15 \leq x \leq 0.2$ and $0 < y < 0.5$ in the first amorphous magnetic alloy layer, and $0.2 < x \leq 0.35$ and y between $0 < y < 0.5$ in the second amorphous magnetic alloy layer. At room temperature the first amorphous magnetic alloy layer displays magnetic dominance of the FeCo sub-lattice, and the second alloy layer displays magnetic dominance of the Tb or Dy sub-lattice.

The optico-thermal magnetic memory medium in this invention displays a high signal level as it uses a first layer of TbFeCo or DyFeCo ternary amorphous magnetic alloy displaying magnetic dominance of the FeCo sub-lattice at room temperature. It also suppresses increases in the noise level as it uses a second layer of TbFeCo or DyFeCo ternary amorphous magnetic alloy displaying magnetic dominance of the Tb or Dy sub-lattice and exchange-coupling. A good signal-to-noise ratio can therefore be obtained. The exchange-coupling further allows writing at low energy levels.

In a preferred embodiment of the invention, the amorphous magnetic alloys layers are arranged so that x increases and y decreases within the range of $0.15 \leq x \leq 0.35$ and $0 < y \leq 0.5$, from the plane of incidence of the light.

With such gradual changes in the depth direction of the film, small amounts of Tb or Dy and large amounts of Co in the plane of incidence of the light will produce a film with the highest possible Kerr rotation angle, and with a high signal level. When the amounts of Tb or Dy at the bottom of the film are large, and that of Co is small at the bottom of the film, the rise in noise level is repressed. The result is good sensitivity at writing, and an efficient optical regeneration output.

DETAILED DESCRIPTION OF THE EMBODIMENTS

Figure 3:
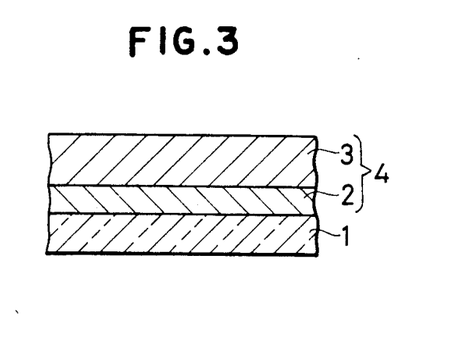
FIG. 3 is a cross section of an embodiment of the optico-thermal magnetic memory medium.

FIG. 3 shows a cross section of an embodiment of the optico-thermal magnetic memory medium according to the invention. Here: 1 is the substrate, 2 is a first ternary amorphous magnetic alloy layer of TbFeCo, 3 is a second ternary amorphous magnetic alloy layer of TbFeCo. The first and second amorphous magnetic alloy layers form the magnetic layer 4. The substrate 1 is made of a non-magnetic material, e.g., glass, ceramic, or plastic.

The first ternary amorphous magnetic alloy layer of TbFeCo 2 has the composition of the formula $Tb_x(Fe_{1-y}Co_y)_{1-x}$ where $0.15 \leq x \leq 0.2$ and $0 < y < 0.5$, and the layer displays magnetic dominance of the FeCo sub-lattice at room temperature.

The second ternary amorphous magnetic alloy layer of TbFeCo 3 has the composition of the formula $Tb_x(Fe_{1-y}Co_y)_{1-x}$ where $0.2 \leq x \leq 0.35$ and $0 < y < 0.5$. This layer displays magnetic dominance of the Tb sublattice at room temperature. There must be exchange-coupling between the first and second ternary amorphous magnetic alloy TbFeCo layers.

The film forming the magnetic layer described above may be produced with sputtering or vacuum evaportion methods.

The following are detailed explanations of examples of this invention.

EXAMPLE A-1

Substrate: 1.2 mm thick plastic substrate
First ternary amorphous magnetic TbFeCo alloy layer: $Tb_{18.6}(Fe_{70}Co_{30})_{81.4}$
  Film thickness: 200 Å
  Retentivity: $Hc \approx 2$ KOe
  Curie temperature: 250° C.
Second ternary amorphous magnetic TbFeCo alloy layer: $Tb_{23.6}(Fe_{90}Co_{10})_{76.4}$
  Film thickness: 600 Å
  Retentivity: $Hc \approx 10$ KOe
  Curie temperature: 180° C.

With this material composition, an example of the optico-thermal magnetic memory medium in this invention, was manufactured by sputtering.

COMPARATIVE EXAMPLE A-1

Figure 4:
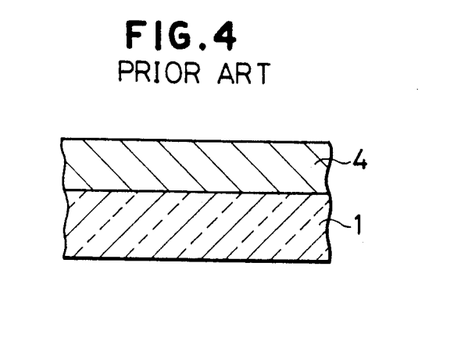
FIG. 4 is a cross section of an optico-thermal magnetic memory medium of the prior art.

An optico-thermal magnetic memory medium similar to Example A-1 was made by not including the first ternary amorphous magnetic TbFeCo alloy layer, and using an 800 Å thick $Tb_{18.6}(Fe_{70}Co_{30})_{81.4}$ layer FIG. 4 is a cross section of this comparative example.

EXAMPLES A-2 to A-5

Other examples of optico-thermal magnetic memory media of this invention were made in the same manner as in the Example A-1, except for the material with compositions that are shown in Table 2 at the end of the specification.

COMPARATIVE EXAMPLES A-2 to A-5

Other comparative examples of optico-thermal magnetic memory media were made in the same manner as in the Example A-1 except for the material compositions that are shown in Table 2.

Test of Recording and Reproduction Characteristics

Figure 5:
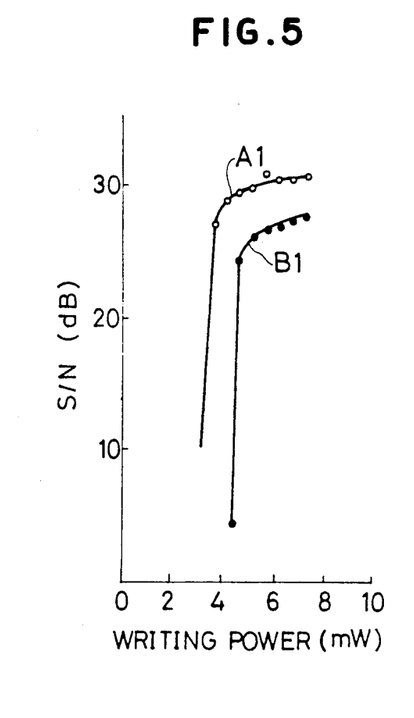
FIG. 5 shows changes in the signal-to-noise ratio (dB) with changes in the writing power (mW).
Figure 6:
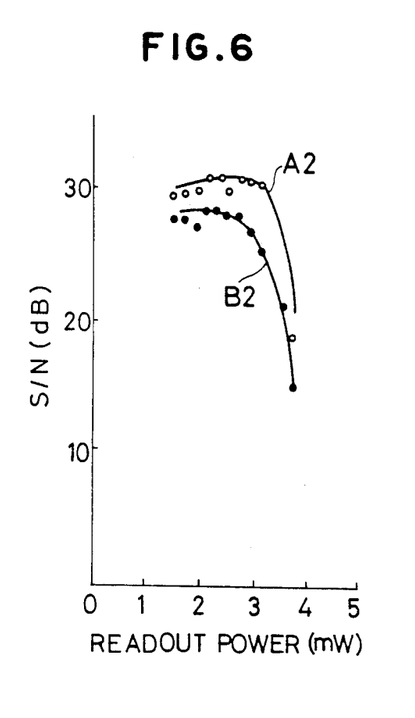
FIG. 6 shows changes in the signal-to-noise ratio with changes in the readout power (mW).

Using the examples and comparative examples of optico-thermal magnetic memory media above, a test of recording and reproduction characteristics was made at a disk speed of 9.8 m/s and a recording frequency of 1 MHz. The results are shown in FIGS. 5 and 6. FIG. 5 shows the change in the signal-to-noise ratio (dB) with writing power (mW), the abscissa is the writing power (mW) and the ordinate is the signal-to-noise ratio. FIG. 6 shows the changes in the signal-to-noise ratio (dB) with readout power (mW), (A1) and (A2) are for the examples and (B1) and (B2) are for comparative example A-1, the abscissa is the readout power (mW) and the ordinate is the signal-to-noise ratio. The signal-to-noise ratio for these optico-thermal magnetic memory media of the material compositions used are also shown in Table 2.

It will be seen that the examples of the invention has a higher signal-to-noise ratio than the comparative examples even at low power. As a result, writing is possible with lower power. In the examples the high signal-to-noise ratios are maintained even at high readout power levels.

With the example of optico-thermal magnetic memory media here, writing is possible with lower energies while a high signal-to-noise ratio is maintained up to higher readout power, and the optically regenerated output is higher than with prior art media. With the use of the media as an optico-thermal memory such as a beam-addressable memory which utilizes a light beam for writing and utilizes the Kerr effect for readout, an excellent device with high density and high signal-to-noise ratio is possible.

A silicon nitride film or other dielectric layer may be inserted between the substrate 1 and the first TbFeCo ternary amorphous magnetic alloy layer 2 to give an increased Kerr rotation angle effect.

In the above embodiment, reproduction of the records takes place from the substrate side, however it is also possible to reproduce records from the film side by reversing the order of deposition of the first and second TbFeCo ternary amorphous magnetic alloy layers.

There is no necessity to prescribe which of the two TbFeCo ternary amorphous magnetic alloy layers must be the readout layer and which the writing layer.

Similarly there is no necessity to prescribe which layer must have the high retentivity and which the low.

Figure 7:
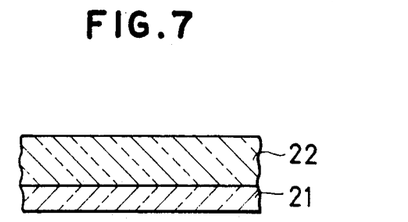
FIG. 7 is a cross section of another embodiment of the optico-thermal magnetic memory medium according to this invention.

FIG. 7 is the cross section of an optico-thermal magnetic memory medium of another embodiment of the present invention: 21 is the substrate, 22 is the Tb-Fe-Co ternary amorphous magnetic alloy layer that changes composition in the depth direction. The substrate 21 is of plastic, glass, ceramics, or other non-magnetic material. The TbFeCo ternary amorphous magnetic layer 22 of the general formula $Tb_x(Fe_{1-y}Co_y)_{1-x}$ with x increasing with depth from the surface of incidence of light within the range of $0.15 \leq x \leq 0.35$ and $0 < y < 0.50$. When the arrangement is such that light for recording or reproduction is irradiated from the substrate side x increases with depth from the surface of the film that is directly on the substrate and y decreases in this direction, away from the substrate.

Sputtering or vacuum evaporation may be used to produce this layer. With sputtering, Tb, Fe, and Co, are introduced as pure metal targets and the power is gradually changed, the composition of the film will then change in the film thickness direction. When the magnetic alloy layers are produced by gradual changes in the composition exchange-coupling is considered to become established between adjacent layers:

The following are examples of the above embodiment of the invention.

EXAMPLE B-1

Substrate: 1.2 mm thick grooved plastic substrate
TbFeCo ternary amorphous magnetic alloy layer: 1000 Å film thickness
Composition of film on the substrate: $Tb_{18.6}(Fe_{70}Co_{30})_{81.4}$
Composition at the bottom of the film: $Tb_{33}(Fe_{85}Co_{15})_{67}$ An example of the optico-thermal magnetic memory medium of this invention with the above composition and the structure as shown in FIG. 7 was obtained.

Figure 8:
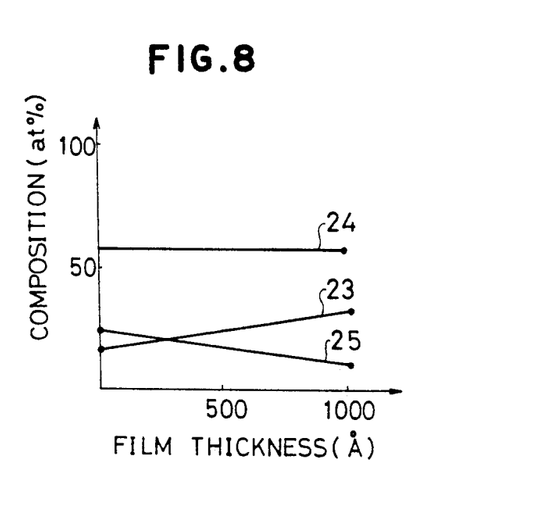
FIG. 8 shows the changes in element composition (at %) with film thickness (A) of the ternary magnetic alloy layer of an embodiment of the optico-thermal magnetic memory medium of this invention.

FIG. 8 is the Auger electron spectroscopic analysis of the TbFeCo ternary amorphous magnetic alloy layer of the above example of an optico-thermal magnetic memory medium. The figure shows the changes in every component element (at %) for the film layer (Å) from the surface of the irradiated light, 23 is the characteristics of Tb, 24 that of Fe, and 25 of Co.

Next, the optical reproduction output for the optico-thermal magnetic memory medium in this example was measured. The disk speed was 9.8 m/s and the recording frequency 1 MHz. Compared with a recording medium having TbFeCo ternary amorphous magnetic alloy layer with uniform composition in the direction of the film thickness the signal-to-noise ratio is 5 dB higher.

In the above example the magnetic layer is placed directly on the plastic substrate. However, a recording medium having $Si_3N_4$ or other dielectric substance placed on the plastic substrate, followed by the layer of varying composition (varying in the direction of the film thickness) according to the invention and with a protective film placed on top has been found to give a high signal-to-noise ratio.

Figure 9:
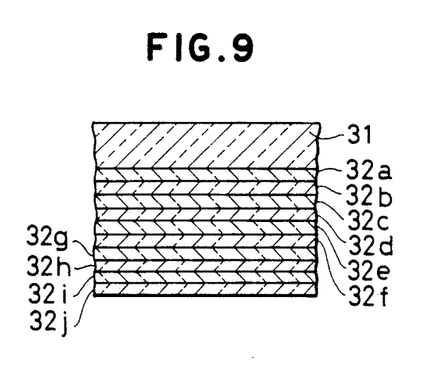
FIG. 9 is an example of a cross section of another embodiment of the optico-thermal magnetic memory medium in this invention.

In the example, the composition was continuously changed, but an effect similar to the example is also produced when the change is stepwise. Such an example is shown in FIG. 9, in which 32a to 32j are magnetic $Tb_x(Fe_{1-y}Co_y)_{1-x}$ layers. x and y have the following values for each of the layers 32a to 32j:

32a: x=18, and y=30
32b: x=19.5 and y=28
32c: x=21 and y=26
32d: x=22.5 and y=24
32e: x=24 and y=22
32f: x=25.5 and y=20
32g: x=27 and y=18
32h: x=28.5 and y=16
32i: x=30 and y=14
32j: x=31.5 and y=12

As explained above, this embodiment comprises a TbFeCo ternary amorphous magnetic alloy layer placed on a substrate, with the magnetic alloy layer having the general formula $Tb_x(Fe_{1-y}Co_y)_{1-x}$ and having an axis of easy magnetization perpendicular to the film surface. The value x successively increases and y successively decreases with the depth from the surface of incidence of light, within the range of $0.15 \leq x \leq 0.35$ and $0 < y \leq 0.50$. The result is an optico-thermal magnetic recording medium that permits an efficient use of the largest possible Kerr rotation angle to give an efficient optical reproduction output.

Figure 10:
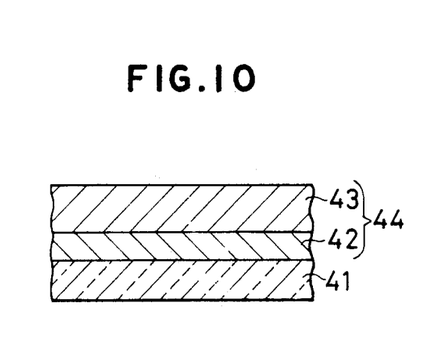
FIG. 10 is a cross section off a further embodiment of the optico-thermal magnetic memory medium in this invention.

FIG. 10 is a cross section of a further embodiment of the optico-thermal magnetic memory medium in this invention, it is similar to FIG. 3, but is different in that the alloy layers 42 and 43 are DyFeCo ternary amorphous magnetic alloy layers.

The first DyFeCo ternary amorphous magnetic alloy layer 42 has the formula $Dy_x(Fe_{1-y}Co_y)_{1-x}$ with $0.15 \leq x \leq 0.2$ and $0 < y < 0.5$ and with magnetic dominance of the FeCo sub-lattice at room temperature.

The second DyFeCo ternary amorphous magnetic alloy layer 43 has the formula $Dy_x(Fe_{1-y}Co_y)_{1-x}$ with $0.2 < x \leq 0.35$ and $0 < y < 0.5$ and with magnetic dominance of the Dy sub-lattice at room temperature. There must be exchange-coupling between the first and second DyFeCo ternary amorphous magnetic alloy layers.

A magnetic layer of a composition like the above may be produced by sputtering or vacuum evaporation methods such that the incident light is irradiated from the first amorphous alloy layer.

Figure 11:
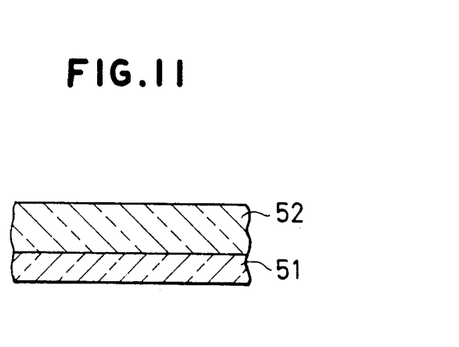
FIG. 11 is a cross section of a further embodiment of yet another optico-thermal magnetic memory medium according to the present invention.

FIG. 11 is a cross section of another example of the optico-thermal magnetic memory medium in this invention, 51 is a substrate, and 52 is a DyFeCo ternary amorphous magnetic alloy layer with the alloy composition gradually changing in the depth direction. The substrate 51 can be of plastic, glass, ceramics, or other non-magnetic material. The DyFeCo ternary amorphous magnetic alloy layer 52 is of the composition $Dy_x(Fe_{1-y}Co_y)_{1-x}$ with x increasing within the range of $0.15 \leq x \leq 0.35$ and y decreasing within the range of $0 < y < 0.50$, in the direction of the depth from the surface of light incidence. When the arrangement is such that the light for recording or regeneration is irradiated from the substrate side, x is increasing through the layer away from the substrate while y is decreasing in the same direction.

This layer may be produced by, for example, sputtering or vacuum evaporation methods. With sputtering, Dy, Fe, and Co, are introduced as pure metal targets and the power is gradually changed; the composition of the film will then change in the film thickness direction. When the magnetic alloy layers are produced by gradual changes in the composition exchange-coupling is considered to become established between adjacent layers.

The following is a description of examples.

EXAMPLE C-1

Substrate: 1.2 mm thick plastic substrate
First DyFeCo ternary amorphous magnetic alloy layer: $Dy_{18.6}(Fe_{65}Co_{35})_{81.4}$
Film thickness: 200 Å
Retentivity $Hc \approx 2$ KOe
Curie temperature: 250°
Second DyFeCo ternary amorphous magnetic alloy Layer: $Dy_{23.6}(Fe_{90}Co_{10})_{76.4}$
Film thickness: 600 Å
Retentivity $Hc \approx 10$ KOe
Curie temperature: 150°

An example of the optico-thermal magnetic memory medium with the above composition was manufactured by sputtering.

COMPARATIVE EXAMPLE C-1

Figure 12:
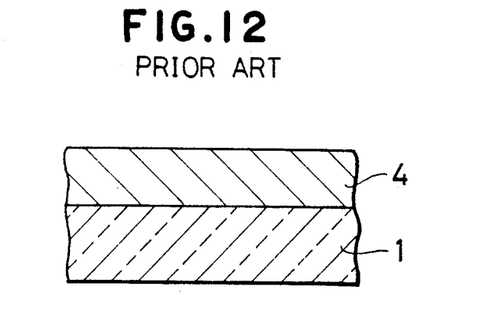
FIG. 12 is a cross section of an optico-thermal magnetic memory medium of the prior art.

An optico-thermal magnetic memory medium similar to Example C-1 was made by not including the first DyFeCo ternary amorphous magnetic alloy layer, and using an 800 Å thick $Dy_{23.6}(Fe_{90}Co_{10})_{76.4}$ layer. FIG. 12 is a cross section of this comparative example.

EXAMPLES C-2 to C-5

Other examples were made in the same manner as in the Example C-1 except for the material compositions that are shown in Table 3.

EXAMPLE D-1

Substrate: 1.2 mm thick grooved plastic substrate
DyFeCo ternary amorphous magnetic alloy layer: 1000 Å film thickness
Composition of film on the substrate: $Dy_{18.6}(Fe_{70}Co_{30})_{81.4}$
Composition at the bottom of the film: $Dy_{33}(Fe_{85}Co_{15})_{67}$ An example of the optico-thermal magnetic memory medium of the above composition, and shown in FIG. 11, with the composition of the DyFeCo ternary amorphous magnetic alloy layer changing in the depth direction of the film was obtained.

Figure 13:
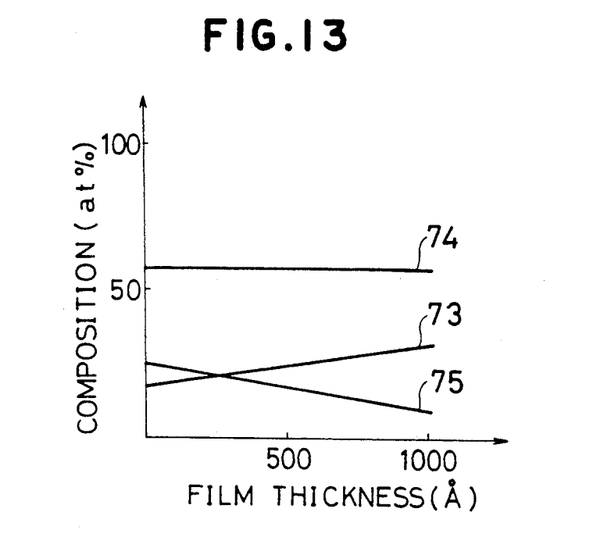
FIG. 13 shows changes (at %) in the elements with film thickness (A) of the ternary magnetic alloy layer (across the film) in the embodiment of FIG. 11.

FIG. 13 is the Auger electron spectroscopic analysis of the DyFeCo ternary amorphous magnetic alloy layer of the above example of an optico-thermal magnetic memory medium. The figure shows the changes in every component element (at %) for the film layer (Å) from the surface of the light incidence, 73 is the characteristics of Dy, 74 that of Fe, and 75 of Co.

EXAMPLE D-2

Figure 14:
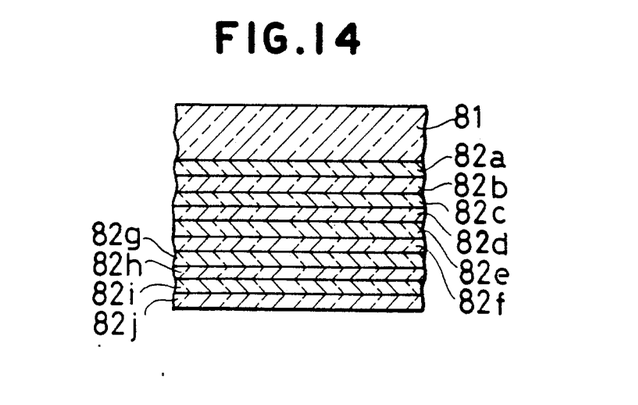
FIG. 14 is a cross section of a further embodiment of the optico-thermal magnetic memory medium in this invention.

Example D-1 is another example of the present invention where the composition of the optico-thermal magnetic recording medium changes are made stepwise. This example is shown in FIG. 14, in which $82a$ to $82j$ are the magnetic $Dy_x(Fe_{1-y}Co_y)_{1-x}$ layers. x and y have the following values for the respective layers $82a$ to $82j$.

$82a$: x=18 and y=30
$82b$: x=19.5 and y=28
$82c$: x=21 and y=26
$82d$: x=22.5 and y1=24
$82e$: x=24 and y=22
$82f$: x=25.5 and y=20
$82g$: x=27 and y=18
$82h$: x=28.5 and y=16
$82i$: x=30 and y=14
$82j$: x=31.5 and y=12

Test of Recording and Reproduction Characteristics

Figure 15:
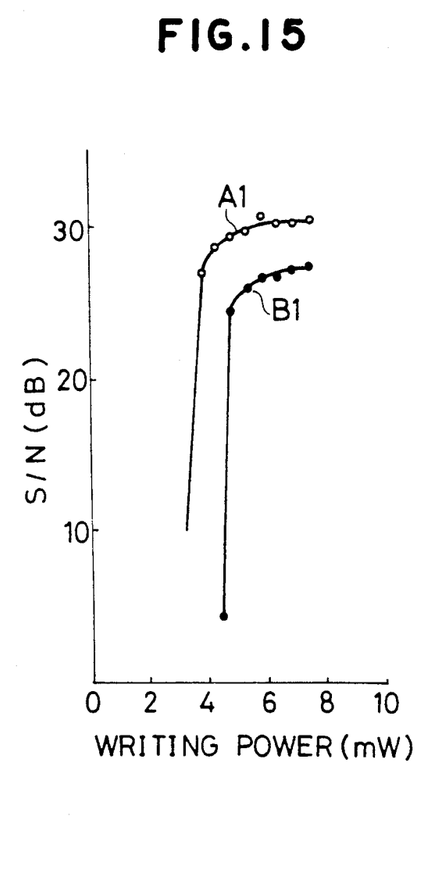
FIG. 15 shows changes in the signal-to-noise ratio with changes in the writing power (mW).
Figure 16:
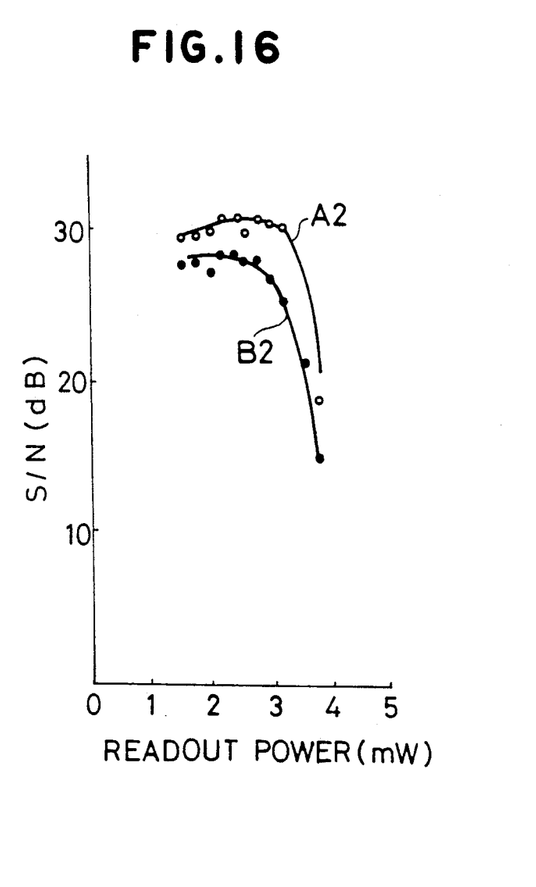
FIG. 16 shows changes in the signal-to-noise ratio with changes in the readout power (mW).

Using the C-1 to C-5 examples and comparative examples of optico-thermal magnetic memory media above, a test of recording and reproduction characteristics was made at a disk speed of 9.8 m/s and a recording frequency of 1 MHz. The results are shown in FIGS. 15 and 16. FIG. 15 shows the changes in the signal-to-noise ratio (dB) with writing power (mW), (m) in the figures is for the examples and (n) is for the comparative examples C-1. The abscissa is the writing power (mW) and the ordinate is the signal-to-noise ratio. FIG. 16 shows the changes in the signal-to-noise ratio (dB) with readout power (mW), (A1) and (A2) are for the examples and (B1) and (B2) are for comparative example C-1, the abscissa is the readout power (mW) and the ordinate is the signal-to-noise ratio. Table 3 shows the material compositions and the signal-to-noise ratio for these optico-thermal magnetic memory media.

The results show that the examples has a higher signal-to-noise ratio than the comparative examples even at lower power, and as a result writing is possible with lower power. In the examples the high signal-to-noise ratios are maintained even at high readout power levels.

When comparing the results of the above test of recording and reproduction characteristics for an embodiment of the optico-thermal magnetic memory medium of FIG. 11 with the varying composition, with those of a DyFeCo ternary amorphous magnetic alloy layer with uniform composition (FIG. 10) throughout the layer, the test shows the former to have a 5 dB higher signal-to-noise ratio.

Like the examples in FIG. 3, these examples of optico-thermal magnetic memory media permit writing with lower energies and readout with higher power while maintaining a high signal-to-noise ratio, and a higher optically regenerated output than in the prior art. If use is made as an optico-thermal memory such as "beam addressable file memory," which utilizes light beam for writing and the Kerr effect for reading, an excellent device with high density and a good signal-to-noise ratio is possible.

A silicon nitride film or other dielectric substance can be provided on the substrate to yield the increased Kerr rotation angle effect.

In the above example and as also explained for the example in FIG. 3, reproduction of the records takes place from the substrate side, however it is also possible to restore records from the film side by reversing the order of deposition of the first and second DyFeCo ternary amorphous magnetic alloy layers, and this must also be considered as an example of this invention.

There is no necessity to prescribe which of the two DyFeCo ternary amorphous magnetic alloy layers must be the readout layer and which the writing layer.

Similarly there is no necessity to prescribe which layer must have the high coercive force and which the low.

As described above, this invention provides an optico-thermal magnetic memory medium which utilizes the highest obtainable Kerr rotation angle to generate an efficient optical regeneration output.

TABLE 1

| Material | Kerr rotation angle (°) | Curie temperature (°C.) |
|---|---|---|
| TbFe | 0.18 | 90 |
| DyFe | 0.12 | 62 |
| GdCo | 0.2 | Writing at compensation point |
| TbDyFe | 0.2 | 75 |
| GdDyFe | 0.24 | 120 |
| GdTbFe | 0.27 | 150 |
| TbFeCo | 0.35 | 150 |

TABLE 2

| | First TbFeCo layer | | Second TbFeCo layer | | S/N |
|---|---|---|---|---|---|
| | Composition | Thickness (Å) | Composition | Thickness (Å) | (dB) |
| Example | | | | | |
| A-1. | $Tb_{18.6}(Fe_{70}Co_{30})_{81.4}$ | 200 | $Tb_{23.6}(Fe_{90}Co_{10})_{76.4}$ | 600 | 31 |
| A-2. | $Tb_{18.6}(Fe_{83}Co_{17})_{81.4}$ | 200 | $Tb_{23.6}(Fe_{90}Co_{10})_{76.4}$ | 600 | 30 |
| A-3. | $Tb_{19.5}(Fe_{70}Co_{30})_{80.5}$ | 200 | $Tb_{23.6}(Fe_{90}Co_{10})_{76.4}$ | 600 | 32 |
| A-4. | $Tb_{18.6}(Fe_{70}Co_{30})_{81.4}$ | 200 | $Tb_{25.0}(Fe_{90}Co_{10})_{75.0}$ | 600 | 31 |
| A-5. | $Tb_{18.6}(Fe_{70}Co_{30})_{81.4}$ | 200 | $Tb_{23.6}(Fe_{90}Co_{10})_{76.4}$ | 1000 | 33 |
| Comparative Example | | | | | |
| A-1. | — | — | $Tb_{23.6}(Fe_{90}Co_{10})_{76.4}$ | 800 | 28 |
| A-2. | $Tb_{18.6}(Fe_{70}Co_{30})_{81.4}$ | 800 | — | — | 20 |
| A-3. | $Tb_{18.6}(Fe_{70}Co_{30})_{81.4}$ | 200 | $Tb_{19.5}(Fe_{90}Co_{10})_{80.5}$ | 600 | 22 |
| A-4. | $Tb_{25.0}(Fe_{70}Co_{30})_{75.0}$ | 200 | $Tb_{23.6}(Fe_{90}Co_{10})_{76.4}$ | 600 | 28 |
| A-5. | $Tb_{18.6}Fe_{81.4}$ | 200 | $Tb_{23.6}(Fe_{90}Co_{10})_{76.4}$ | 600 | 25 |

TABLE 3

| | First DyFeCo layer | | Second DyFeCo layer | | S/N |
|---|---|---|---|---|---|
| | Composition | Thickness (Å) | Composition | Thickness (Å) | (dB) |
| Example | | | | | |
| C-1. | $Dy_{18.6}(Fe_{65}Co_{35})_{81.4}$ | 200 | $Dy_{23.6}(Fe_{90}Co_{10})_{76.4}$ | 600 | 31 |
| C-2. | $Dy_{18.6}(Fe_{70}Co_{30})_{81.4}$ | 200 | $Dy_{23.6}(Fe_{90}Co_{10})_{76.4}$ | 600 | 30 |
| C-3. | $Dy_{19.5}(Fe_{65}Co_{35})_{80.5}$ | 200 | $Dy_{23.6}(Fe_{90}Co_{10})_{76.4}$ | 600 | 32 |
| C-4. | $Dy_{18.6}(Fe_{65}Co_{35})_{80.5}$ | 200 | $Dy_{25.0}(Fe_{90}Co_{10})_{75.0}$ | 600 | 31 |
| C-5. | $Dy_{18.6}(Fe_{65}Co_{35})_{81.4}$ | 200 | $Dy_{23.6}(Fe_{90}Co_{10})_{76.4}$ | 1000 | 33 |
| Comparative Example | | | | | |
| C-1. | — | — | $Dy_{23.6}(Fe_{90}Co_{10})_{76.4}$ | 800 | 27 |
| C-2. | $Dy_{18.6}(Fe_{65}Co_{35})_{81.4}$ | 800 | — | — | 20 |
| C-3. | $Dy_{18.6}(Fe_{70}Co_{30})_{81.4}$ | 200 | $Dy_{19.5}(Fe_{90}Co_{10})_{80.5}$ | 600 | 21 |
| C-4. | $Dy_{25}(Fe_{70}Co_{30})_{75}$ | 200 | $Dy_{23.6}(Fe_{90}Co_{10})_{76.4}$ | 600 | 27 |
| C-5. | $Dy_{18.6}Fe_{81.4}$ | 200 | $Dy_{23.6}(Fe_{90}Co_{10})_{76.4}$ | 600 | 24 |

What is claimed is:

1. An optico-thermal magnetic recording medium, comprising:
   a substrate,
   a first layer of a ternary amorphous magnetic alloy, which is represented by the formula:

$$Tb_x(Fe_{1-y}Co_y)_{1-x}$$

and which has an axis of easy magnetization perpendicular to the film plane of the layer,
   a second layer of a ternary amorphous magnetic alloy, which is represented by the formula:

$$Tb_x(Fe_{1-y}Co_y)_{1-x}$$

and which has an axis of easy magnetization perpendicular to the film plane of the layer,
   wherein said first layer is adjacent to and exchange coupled with said second layer,
   either the first or second layer is formed on said substrate,
   wherein $0.15 \leq x \leq 0.2$ and $0 < y < 0.5$ in the first layer, and $0.2 < x \leq 0.35$ and $0 < y < 0.5$ in the second layer,
   whereby, at room temperature, the FeCo Sub-lattice has magnetic dominance in said first layer, and the Tb sublattice has magnetic dominance in said second layer, and,
   wherein said medium is oriented such that light is incident on said first layer, rather than said second layer, in said medium.

2. The medium of claim 1, wherein the substrate includes a dielectric layer on its surface interposed between said substrate and the amorphous magnetic alloy layers.

3. The medium of claim 1, wherein said first layer is disposed between said second layer and said substrate and said medium is oriented so that light is first incident on said substrate.

4. An optico-thermal magnetic recording medium, comprising:
   a substrate,
   a first layer of a ternary amorphous magnetic alloy, which is represented by the formula:

$$Dy_x(Fe_{1-y}Co_y)_{1-x}$$

and which has an axis of easy magnetization perpendicular to the film plane of the layer,
   a second layer of a ternary amorphous magnetic alloy, which is represented by the formula:

$$Dy_x(Fe_{1-y}Co_y)_{1-x}$$

and which has an axis of easy magnetization perpendicular to the film plane of the layer,
   wherein said first layer is adjacent to and exchange coupled with said second layer,
   either the first or second layer is formed on said substrate,
   wherein $0.15 \leq x \leq 0.2$ and $0 < y < 0.5$ in the first layer, and $0.2 < x \leq 0.35$ and $0 < y < 0.5$ in the second layer,
   whereby at room temperature, the FeCo Sub-lattice has magnetic dominance in said first layer, and the Dy sublattice has magnetic dominance in said second layer, and,
   wherein said medium is oriented such that light is incident on said first layer, rather than said second layer, in said medium.

5. The medium of claim 4, wherein said first layer is disposed between said second layer and said substrate and said medium is oriented so that light is first incident on said substrate.

6. The medium of claim 4, wherein the substrate includes a dielectric layer on its surface interposed between said substrate and the amorphous magnetic alloy layers.

* * * * *